(12) United States Patent
Taniwaki

(10) Patent No.: US 7,553,793 B2
(45) Date of Patent: Jun. 30, 2009

(54) METHOD AND SYSTEM FOR RECOVERING CATALYST FOR FUEL CELL

(75) Inventor: Kazuhiro Taniwaki, Toyota (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 242 days.

(21) Appl. No.: 11/791,962

(22) PCT Filed: Sep. 20, 2006

(86) PCT No.: PCT/IB2006/002606
§ 371 (c)(1),
(2), (4) Date: May 31, 2007

(87) PCT Pub. No.: WO2007/034298
PCT Pub. Date: Mar. 29, 2007

(65) Prior Publication Data
US 2008/0050623 A1    Feb. 28, 2008

(30) Foreign Application Priority Data
Sep. 22, 2005    (JP) ............... 2005-275840

(51) Int. Cl.
| | |
|---|---|
| B01J 37/34 | (2006.01) |
| B01J 20/34 | (2006.01) |
| B01J 38/72 | (2006.01) |
| B01J 21/18 | (2006.01) |
| B01J 23/40 | (2006.01) |
| B01J 23/74 | (2006.01) |
| C22C 19/07 | (2006.01) |
| C22C 5/04 | (2006.01) |
| C21B 11/10 | (2006.01) |
| C21B 13/12 | (2006.01) |
| C21C 5/54 | (2006.01) |
| C21C 5/52 | (2006.01) |
| C22B 11/10 | (2006.01) |
| C22B 1/00 | (2006.01) |
| C21B 11/00 | (2006.01) |
| C10G 55/00 | (2006.01) |
| B02C 17/00 | (2006.01) |
| B03B 7/00 | (2006.01) |
| B04B 5/10 | (2006.01) |
| B07B 15/00 | (2006.01) |
| B03C 1/00 | (2006.01) |
| C22F 1/10 | (2006.01) |
| C22F 1/14 | (2006.01) |
| H01F 1/03 | (2006.01) |
| B22F 1/00 | (2006.01) |
| C21D 1/04 | (2006.01) |

(52) U.S. Cl. .................. 502/185; 502/5; 502/21; 420/435; 420/466; 75/10.67; 75/392; 423/22; 423/138; 241/24.14; 241/24.25; 209/12.1; 209/213; 209/214; 148/103; 148/105; 148/108; 148/513; 148/514; 148/674; 148/678

(58) Field of Classification Search ............ 502/5, 502/21, 185; 420/435, 466; 75/10.67, 392; 423/22, 138; 241/24.14, 24.25; 209/12.1, 209/213, 214; 148/103, 105, 108, 513, 514, 148/674, 678
See application file for complete search history.

(56) References Cited

U.S. PATENT DOCUMENTS 2,953,450 A  *  9/1960  Viles ............... 75/447

(Continued)

FOREIGN PATENT DOCUMENTS

GB    1 493 933 A    11/1977

(Continued)

*Primary Examiner*—Patricia L Hailey
(74) *Attorney, Agent, or Firm*—Kenyon & Kenyon LLP

(57) ABSTRACT

A method for recovering a catalyst for a fuel cell includes a collection step in which a catalyst is collected by attracting, using a magnetic force, a magnetic material contained in at least one of the catalyst and a carrier on which the catalyst is supported. A system for recovering a catalyst for a fuel cell includes a collection device that attracts, using a magnetic force, a magnetic material contained in at least one of a catalyst and a carrier on which the catalyst is supported.

22 Claims, 4 Drawing Sheets

U.S. PATENT DOCUMENTS

| | | | | |
|---|---|---|---|---|
| 3,986,901 A | * | 10/1976 | Plante et al. | 148/105 |
| 4,123,500 A | * | 10/1978 | Acres et al. | 423/35 |
| 4,295,881 A | * | 10/1981 | Saville | 75/10.19 |
| 2005/0081683 A1 | | 4/2005 | Lewins et al. | |

FOREIGN PATENT DOCUMENTS

| | | | |
|---|---|---|---|
| JP | 63-210246 A | | 8/1988 |
| JP | 10-189012 | * | 7/1998 |
| JP | 10-189012 A | | 7/1998 |
| JP | 11-288732 | * | 10/1999 |
| JP | 11-288732 A | | 10/1999 |
| JP | 2004-171921 | * | 6/2004 |
| JP | 2004-171921 A | | 6/2004 |
| JP | 2004-250255 A | | 9/2004 |
| WO | 2007/034298 | * | 3/2007 |

\* cited by examiner

METHOD AND SYSTEM FOR RECOVERING CATALYST FOR FUEL CELL

INCORPORATION BY REFERENCE

This is a 371 national phase application of PCT/IB2006/002606 filed 20 Sep. 2006, claiming priority to Japanese Patent Application No. 2005-275840 filed 22 Sep. 2005, the contents of which are incorporated herein by reference.

BACKGROUND OF THE INVENTION

1. Field of the Invention

The invention relates to a method and system for recovering a catalyst for a fuel cell.

2. Description of the Related Art

Japanese Patent Application Publication No. JP-A-2004-171921 describes a technology for recovering a catalyst or a carrier on which the catalyst is supported. According to the described technology, a membrane-electrode assembly (MEA) of a fuel cell is dissolved and insoluble elements are separated from a solution by a centrifugal separator or a filter, whereby the catalyst or the carrier on which the catalyst is supported, contained in the insoluble elements, are recovered.

According to the described technology, the catalyst (Pt) is barely separated from ink of the catalyst before the MEA is formed. However, there has not been established a method for efficiently separating the catalyst (Pt) or the carrier on which the catalyst is supported (carbon on which Pt is supported) from other elements (an electrolyte and diffusion layers) after electrodes are formed. For example, it is difficult to recover the catalyst or the carrier on which the catalyst is supported from an already-assembled fuel cell (e.g. a fuel cell that turns out to be defective after the electrodes are formed, a fuel cell of which the evaluation has been finished and which is no longer necessary, and a fuel cell that has reached its end of life). Also, separating the catalyst or the carrier on which the catalyst is supported somehow from the other elements increases the cost. For these reasons, it is almost impossible to recover the catalyst or the carrier on which the catalyst is supported. Accordingly, the reliability for recovery of the catalyst or the carrier on which the catalyst is supported remains low. For example, because the carbon on which Pt is supported and the carbon that forms the diffusion layers have substantially the same mass and size, it is difficult to separate these carbons from each other using a centrifugal separator or a filter.

DISCLOSURE OF THE INVENTION

The invention provides a method and device for reliably recovering a catalyst or a carrier on which the catalyst is supported.

A first aspect of the invention relates to a method for recovering a catalyst for a fuel cell. The method includes a collection step. In the collection step, a catalyst is collected by attracting, using a magnetic force, a magnetic material contained in at least one of the catalyst and a carrier on which the catalyst is supported.

According to the method, the catalyst is collected in the collection step by attracting the magnetic material using the magnetic force. Accordingly, recovery of only the catalyst (separation of the catalyst from diffusion layers, and attraction and collection of only the catalyst) is performed more easily and reliably.

The catalyst may be made of PtCo (an platinum cobalt alloy).

In this case, because Co is a magnetic material, the catalyst is attracted by the magnetic force. In contrast, when the catalyst is made only of Pt, the catalyst is not attracted by the magnetic force because Pt is a non-magnetic material.

The method may include a recycle step, which is executed after the collection step. In the recycle step, the collected catalyst is reused as a material for catalyst layers of a new fuel cell.

Thus, the recovered catalyst is recycled. A catalyst for the new fuel cell, which is produced by reusing the recovered catalyst, is within the scope of the invention.

The collection step may be executed in a waste-solution line through which a waste solution containing the catalyst flows.

In this case, the catalyst is recovered from the waste-solution of catalyst ink, because the collection step is executed in the waste-solution line through which the waste-solution flows.

The method may include a centrifugation step, which is executed after the collection step. In the centrifugation step, the catalyst is extracted, through centrifugation, from substance collected in the collection step.

Thus, the residual waste solution in the collected substance is separated from the catalyst, whereby only the catalyst is extracted.

The method may include a pulverization step, which is executed before the collection step. In the pulverization step, a MEA including the catalyst layers is pulverized into small particles.

Thus, the diffusion layers and an electrolyte membrane are also pulverized into small particles in the pulverization step. Accordingly, the catalyst or the carrier on which the catalyst is supported, containing the magnetic material, is separated, through magnetic attraction, from the small particles of the diffusion layers and the electrolyte membrane, which do not contain the magnetic material, more reliably (than the case where the pulverization step is not executed). As a result, the catalyst or the carrier on which the catalyst is supported is recovered more reliably (than the case where the pulverization step is not executed).

The method may include a dispersion step, which is executed between the pulverization step and the collection step. In the dispersion step, the small particles obtained by pulverizing the MEA are dispersed in a solvent.

Thus, the small particles of the electrolyte membrane contained in the pulverized elements are dissolved in the solvent. Accordingly, the catalyst or the carrier on which the catalyst is supported, containing the magnetic material that is not dissolved in the solvent, is separated, through magnetic attraction, from the electrolyte membrane, which does not contain the magnetic material, more reliably (than the case where the dispersion step is not executed). As a result, the catalyst or the carrier on which the catalyst is supported is recovered more reliably (than the case where the dispersion step is not executed).

The small particles obtained by pulverizing the MEA in the pulverization step may be sent to the collection step while being dry so that the catalyst is recovered.

Thus, it is unnecessary to separate the catalyst and the carrier on which the catalyst is supported from solution. Therefore, the number of steps is reduced as compared with the case where the dispersion step is executed.

A second aspect of the invention relates to a system for recovering a catalyst for a fuel cell. The system includes a collection device that attracts, using a magnetic force, a magnetic material contained in at least one of a catalyst and a carrier on which the catalyst is supported.

With the system, the magnetic material contained in at least one of the catalyst and the carrier on which the catalyst is supported is attracted by the magnetic force of the collection device. Thus, recovery of only the catalyst (separation of the catalyst from diffusion layers, and attraction of only the catalyst) is performed more easily and reliably.

The collection device may be provided onto the waste-solution line through which a waste-solution containing the catalyst flows. A centrifugal separation device may be further provided. The centrifugal device extracts the catalyst, through centrifugation, from the substance collected by the collection device.

Thus, the residual waste solution in the collected substance is separated from the catalyst, whereby only the catalyst is extracted.

The system may include a pulverization device that pulverizes MEA including catalyst layers before the magnetic material is attracted by the collection device.

Thus, the diffusion layers and the electrolyte membrane are also pulverized into small particles by the pulverization device. Accordingly, the catalyst or the carrier on which the catalyst is supported, containing the magnetic material, is separated, through magnetic reaction, from the small particles of the diffusion layers and the electrolyte membrane, which do not contain the magnetic material, more reliably (than the case where the pulverization step is not executed). As a result, the catalyst or the carrier on which the catalyst is supported is recovered more reliably (than the case where the pulverization step is not executed).

The system may include a dispersion device. The dispersion device disperses the pulverized MEA that includes the catalyst layers in the solvent between when the MEA is pulverized into the small particles by the pulverization device and when the magnetic material is attracted by the collection device.

Thus, the small particles of the electrolyte membrane contained in the pulverized MEA are dissolved in the solvent. Accordingly, the catalyst or the carrier on which the catalyst is supported, containing the magnetic material that is not dissolved in the solvent, is separated, through magnetic attraction, from the electrolyte membrane, which does not contain the magnetic material, more reliably (than the case where the dispersion step is not executed). As a result, the catalyst or the carrier on which the catalyst is supported is recovered more reliably (than the case where the dispersion step is not executed).

BRIEF DESCRIPTION OF THE DRAWINGS

The foregoing and further objects, features and advantages of the invention will become apparent from the following description of example embodiments with reference to the accompanying drawings, wherein the same or corresponding portions will be denoted by the same reference numerals and wherein.

DETAILED DESCRIPTION OF THE PREFERRED EMBODIMENTS

Figure 1:
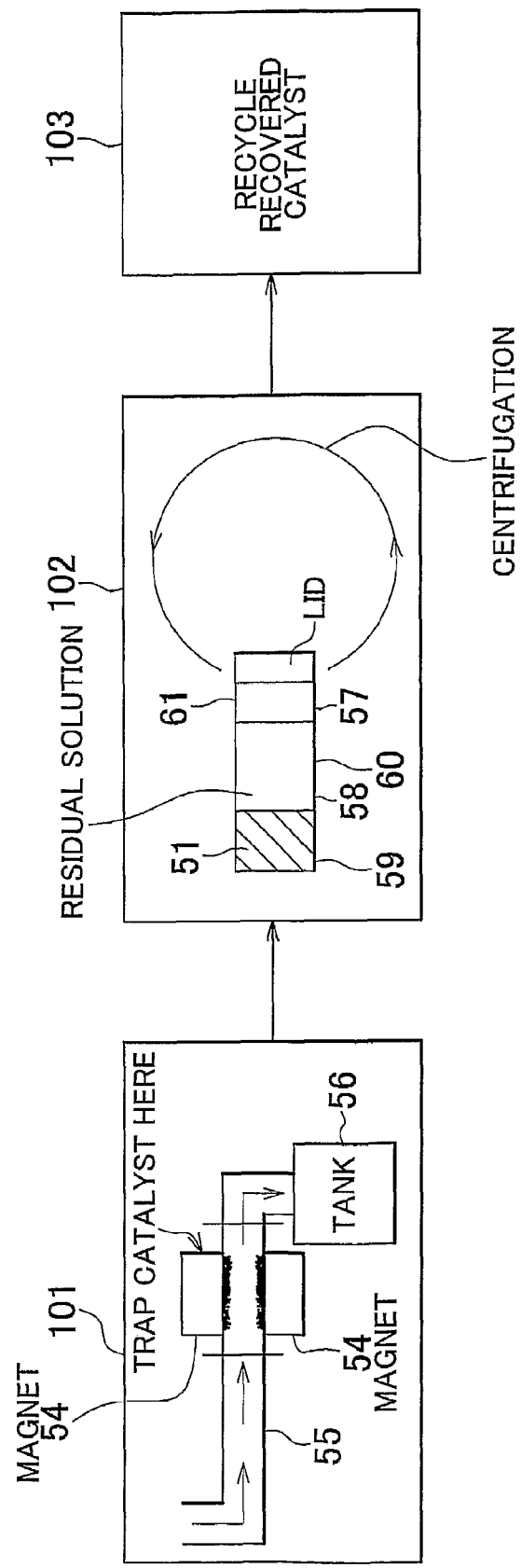
FIG. 1 is the process chart for a method and system for recovering a catalyst for a fuel cell according to a first embodiment of the invention.
Figure 2:
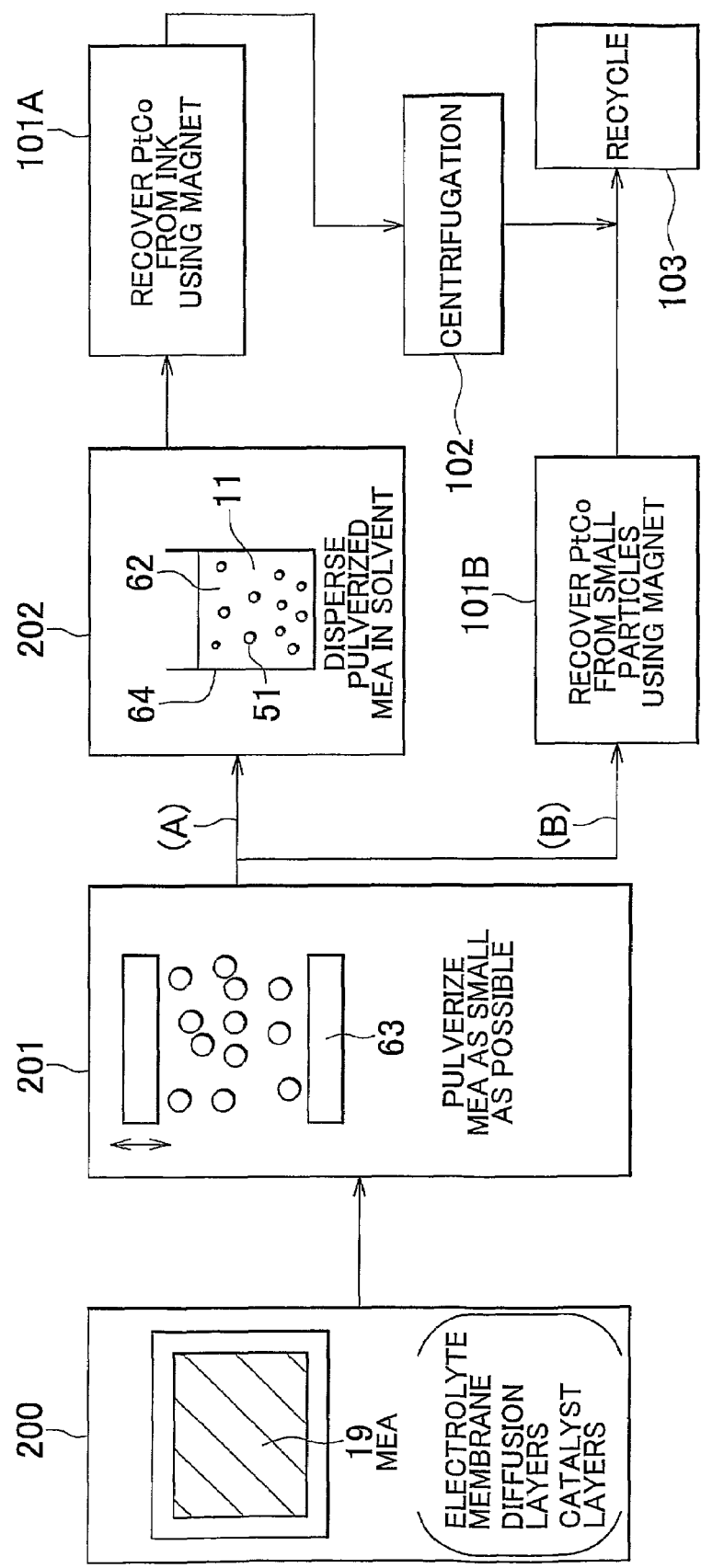
FIG. 2 is the process chart for a method and system for recovering a catalyst for a fuel cell according to a second embodiment of the invention.

Hereafter, methods for recovering a catalyst for a fuel cell according to embodiments of the invention, a fuel cell that includes a catalyst which is recovered by any one of the methods according to the embodiments of the invention, and systems for recovering a catalyst for a fuel cell according to the embodiments of the invention will be described with reference to FIGS. 1 to 5. FIG. 1 shows a first embodiment of the invention. FIG. 2 shows a second embodiment of the invention. FIGS. 3 to 6 are used to describe any one of the first and the second embodiments of the invention. The portions that are common to the first and the second embodiments of the invention will be denoted by the same reference numerals. First, the portions that are common to the first and the second embodiments of the invention, and the effects thereof will be described with reference to FIGS. 1 and 3 to 5.

The method and system for recovering a catalyst for a fuel cell according to the embodiment of the invention is applied, for example, to a polymer electrolyte fuel cell. A fuel cell 10 in FIG. 4 is, for example, a stationary fuel cell for household use or a mobile fuel cell mounted in a fuel cell vehicle.

Figure 4:
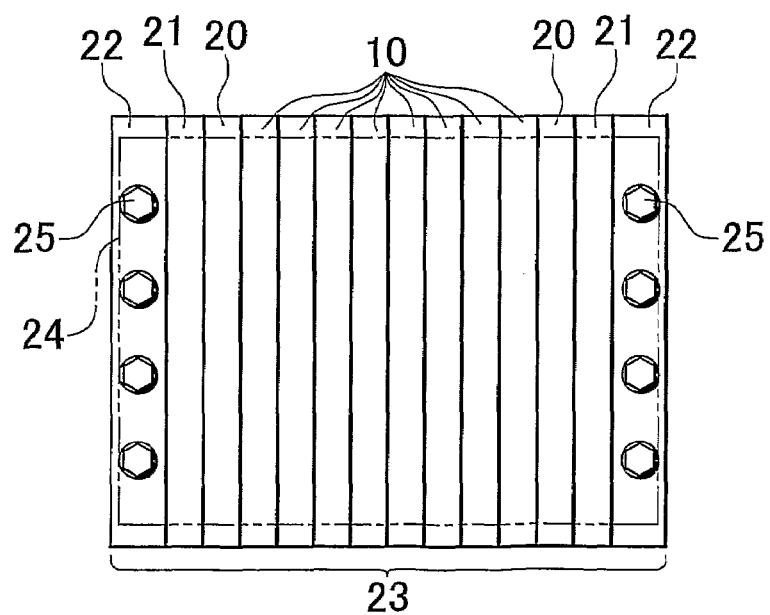
FIG. 4 is the side view of a fuel cell that is produced by reusing a catalyst, which is recovered by the method according to each embodiment of the invention or by use of the system according to each embodiment of the invention.
Figure 5:
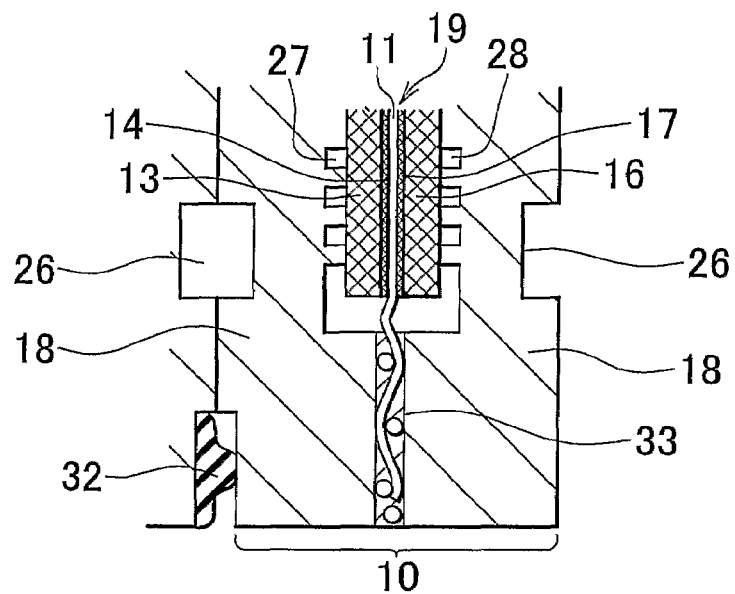
FIG. 5 is the enlarged cross-sectional view partially showing the fuel cell in FIG. 4.
Figure 6:
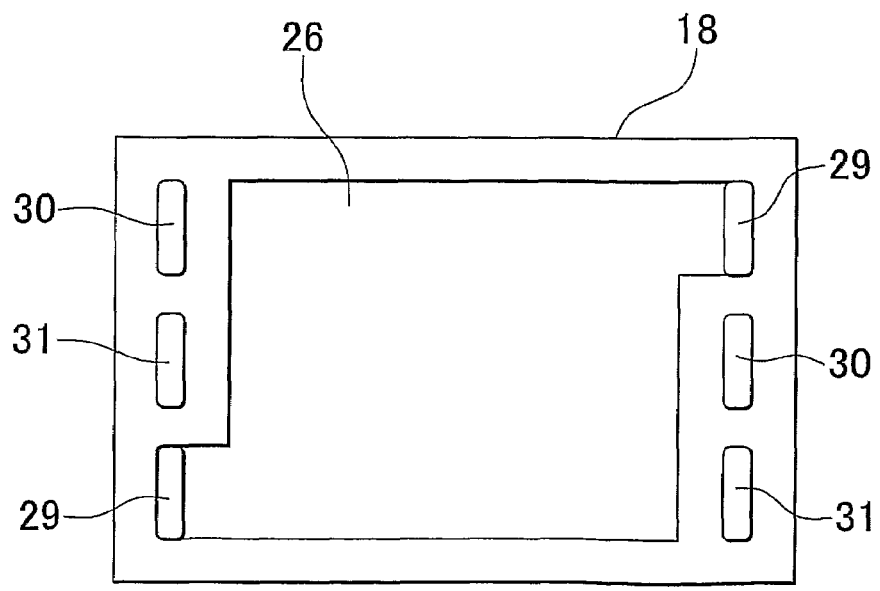
FIG. 6 is the front view of the fuel cell in FIG. 4.

As shown in FIGS. 4 to 6, the polymer electrolyte fuel cell 10 is formed of a stacked body including a Membrane-Electrode Assembly (hereinafter, simply referred to as a "MEA") 19 and separators 18.

The MEA 19 includes an electrolyte membrane 11 formed of an ion-exchange membrane; an electrode (an anode, a fuel electrode) 14 formed of a catalyst layer arranged on one of the faces of the electrolyte membrane 11; and another electrode (a cathode, an air electrode) 17 formed of a catalyst layer arranged on the other face of the electrolyte membrane 11. A diffusion layer 13, through which gas is diffused, is arranged between the MEA 19 and the separator 18 on the anode side. Another diffusion layer 16 is arranged between the MEA 19 and the other separator 18 on the cathode side.

Each of the catalyst layers, which form the electrodes 14 and 17, includes a catalyst 51, a carrier 52 (usually, a carbon particle or a carbon fifer) on which the catalyst 51 is supported, and a binder that bonds the adjacent carriers 52 together. The binder contains, for example, adhesive materials such as an electrolyte, which is made of the same material as the electrolyte that forms the electrolyte membrane 11 and that has proton-conductivity, and PVDF which does not have proton-conductivity. The viscosity of the binder decreases when the binder is heated or dissolved, for example, in an organic solvent. An electrode material to be applied onto the electrolyte membrane 11 is in liquid form, because the electrode material is mixed in an organic solvent (e.g. ethanol) or water, and then applied onto the electrolyte membrane 11. The carrier 52 may contain a magnetic material such as cobalt.

A cell module (when a cell module includes only one cell, the cell 10 corresponds to the cell module) is formed by stacking the MEA 19 and the separators 18. The cell modules are stacked on top of each other to form a cell stacked body. A terminal 20, an insulator 21, and an end plate 22 are arranged at each of both ends of the cell stacked body in the direction in which the cells 10 are stacked. Then, the each end plate 22, arranged at the end of the cell stacked body, is fixed, with bolts/nuts 25, to a fastening member (e.g. a tension plate 24) that is arranged on the outer side of the cell stacked body and that extends in the direction in which the cells 10 are stacked. A fuel cell stack 23 is thus formed. A fastening load is applied, in the direction in which the cells 10 are stacked, to the cell stacked body by an adjustment screw arranged on the end plate 22 at one end, via a spring provided on the inner side of this end plate 22.

The separator 18 is a carbon separator, a metal separator, a conductive resin separator, a combination of a metal separator and a resin frame, or the like. In an area of the separator 18, in which electric power generation is performed, a fuel gas passage 27 and an oxidizing gas passage 28 are formed. Fuel gas (hydrogen) is supplied to the anode 14 through the fuel gas passage 27. Oxidizing gas (oxygen, usually air) is supplied to the cathode 17 through the oxidizing gas passage 28. A coolant passage 26, through which a coolant (usually, cooling water) flows, is also formed in the separator 18. In another area of the separator 18, in which electric power generation is not performed, a fuel gas manifold 30, an oxidizing gas manifold 31, and a coolant manifold 29 are formed. The fuel gas manifold 30 is communicated with the fuel gas passage 27. The oxidizing gas manifold 31 is communicated with the oxidizing gas passage 28. The coolant manifold 29 is communicated with the coolant passage 26. The fuel gas, the oxidizing gas, and the coolant are prevented from contacting each other in the cell 10. In each cell module, a first seal member (e.g. an adhesive agent) 33 provides sealing between the two separators 18 facing each other with the MEA 19 interposed therebetween. A second seal member (e.g. a gasket) 32 provides sealing between the adjacent cell modules. Alternatively, the first seal member 33 may be formed of a gasket, and the second seal member 32 may be formed of an adhesive agent.

On the cathode 14 side in each cell 10, an ionization reaction occurs to separate hydrogen into a hydrogen ion (proton) and an electron. The hydrogen ion moves through the electrolyte membrane 11 to the cathode 17 side. On the cathode 17 side, water is produced from oxygen, a hydrogen ion and an electron (an electron which is produced in the anode of the adjacent MEA and then moves through the separator 18 to the cathode 17 side, or an electron which is produced in the anode of the cell arranged at one of the ends of the cell stacked body and then moves, through an external circuit, to the cathode of the cell arranged at the other end of the cell stacked body), and electric power is generated according to the following equations.

Anode side: 

Cathode side: 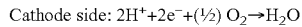

The catalyst layers forming the electrodes 14, 17 of the fuel cell each include the catalyst 51. The catalyst 51 is usually made of expensive noble metal (e.g. Pt). For this reason, preferably, catalysts 51 described in the following (A) and (B) are recovered and reused in new catalysts for fuel cells;
(A) the catalyst 51 which is present in a pipe of an application device when catalyst ink is applied and which is contained in a solution to be treated as a waste solution, and
(B) the catalyst 51 which is included in an already-assembled fuel cell (e.g. a fuel cell that turns out to be defective after the electrodes are formed, a fuel cell of which the evaluation has been finished and which is no longer necessary, and a fuel cell which has reached its end of life).

The method for recovering the catalyst 51 for a fuel cell includes a collection step 101. In the collection step 101, the catalyst 51 is collected by attracting, using a magnetic force, a magnetic material 53, which is contained in at least one of the catalyst 51 and the carrier 52 on which the catalyst 51 is supported.

The fuel cell including the catalyst that is recovered by the above-described method is also within the scope of the invention.

The catalyst 51 is made, for example, of PtCo (an platinum cobalt alloy). Pt (platinum) is a non-magnetic material, and Co (cobalt) is the magnetic material 53. Co increases the reactivity of Pt, thereby reducing the required amount of Pt, and allowing the PtCo alloy to be attracted by a magnetic force. Because Co is attracted to a magnet, Pt alloyed with Co is collected together with Co. Usually, a catalyst is made only of Pt. In this case, Pt is not collected by a magnet, because Pt is not attracted by the magnet. The method includes a recycle step 103, which is executed after the collection step 101. In the recycle step 103, the catalyst collected in the collection step 101 is reused as a material for catalyst layers of a new fuel cell. Because the catalyst is reused in the form of the PtCo alloy, the collected catalyst 51 need not be separated into Pt and Co.

The system that directly executes the above-described method includes a collection device 54 that attracts, using a magnetic force, the magnetic material 53 contained in at least one of the catalyst 51 and the carrier 52 on which the catalyst 51 is supported. The collection device 54 is, for example, a magnet (e.g. an electromagnet).

The effects of the above-described method are as follows. At least one of the catalyst 51 and the carrier 52 on which the catalyst 51 is supported contains the magnetic material 53. In the collection step 101, the catalyst 51 is collected by attracting the magnetic material 53 using a magnetic force. Thus, the catalyst 51 and the diffusion layers 13, 16 are separated from each other more easily and reliably. Also, attraction and collection of only the catalyst 51 are performed more easily and reliably. When the catalyst 51 is made of PtCo (the alloy of Pt and Co), the catalyst 51 is attracted to the collection device 54 by a magnetic force because Co is the magnetic material 53. In contrast, when the catalyst 51 is made only of Pt, the catalyst 51 is not attracted by a magnetic force because Pt is a non-magnetic material. When the method includes the recycle step 103, which is executed after the collection step 101 for collecting the catalyst 51 and in which the collected catalyst 51 (containing the magnetic material 53) is reused as the material for the catalyst layers of the new fuel cell, the recovered catalyst 51 is recycled. The catalyst for a fuel cell, which is produced by reusing the recovered catalyst 51, is within the scope of each embodiment of the invention.

The effects of the above-described system are as follows. At least one of the catalyst 51 and the carrier 52 on which the catalyst 51 is supported contains the magnetic material 53. The magnetic material 53 is attracted by a magnetic force of the collection device (e.g. the magnet) 54. Thus, recovery of only the catalyst 51 (separation of the catalyst 51 from the diffusion layers 13, 16, and attraction of only the catalyst 51) is performed more easily and reliably.

Next, the structure and effects specific to the method and system for recovering a catalyst for a fuel cell according to each of the first and the second embodiments of the invention will be described.

Figure 3:
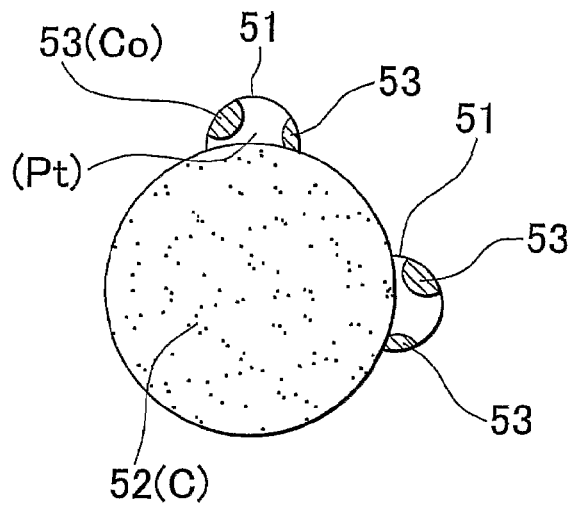
FIG. 3 is an enlarged cross-sectional view showing a catalyst support particle formed of catalysts and a catalyst carrier.

Hereafter, the first embodiment of the invention will be described with reference to FIGS. 1 and 3. First, the method for recovering a catalyst for a fuel cell according to the first embodiment of the invention will be described. According to the method, the catalyst 51 is recovered from a waste solution containing ink discharged from a fuel-cell production line where catalyst ink is applied to the MEA. The method according to the first embodiment of the invention includes the collection step 101. In the collection step 101, the magnetic material 53 contained in the catalyst 51 is attracted, using a magnetic force, to the collection device 54 in a waste-solution line 55 through which the waste solution containing the catalyst 51 flows (a line connecting the catalyst application line, where the catalyst 51 is applied to the electrolyte membrane, to a tank 56 that temporarily stores the waste solution), whereby the catalyst 51 is collected. The catalyst ink from the catalyst application line of the MEA production process (the excessive catalyst ink or the residual solution present in the pipe when application is stopped) is directly discharged to the waste-solution line 55. Therefore, the waste solution flowing through the waste-solution line 55 contains the catalyst 51 in the catalyst ink.

The method according to the first embodiment of the invention includes a centrifugation step 102, which is executed between the collection step 101 and the recycle step 103. In the centrifugation step 102, the catalyst 51 is selectively extracted, through centrifugation, from the substance (including the catalyst 51 and the waste solution adhering to the catalyst 51) collected in the collection step 101. The extracted catalyst 51 is sent to the recycle step 103.

The system for recovering a catalyst for a fuel cell according to the first embodiment of the invention includes the collection device 54 and a centrifugal separation device 57. The collection device 54 is provided onto at the waste-solution line 55 through which the waste solution containing the catalyst 51 flows. The centrifugal separation device 57 is further provided. The centrifugal separation device 57 extracts the catalyst 51, through centrifugation, from the substance (including the catalyst 51 and the waste solution adhering to the catalyst 51) collected by the collection device 54.

The middle view of FIG. 1 schematically shows the state that is realized when the catalyst 51 contained in the waste solution 51 is extracted by the centrifugal separation device 57. When a test tube 58 is turned by the centrifugal separation device 57, the elements, such as the catalyst 51, which have the greatest mass gather in an area 59 of the test tube 58. The turning radius of the test tube 58 is the greatest at the area 59, and the greatest centrifugal force is applied to the area 59. The elements having the second greatest mass gather in an area 60. The turning radius of the test tube 58 at the area 60 is less than that at the area 59. The gas gathers in an area 61. The turning radius of the test tube 58 is the least at the area 61.

The effects of the method according to the first embodiment of the invention are as follows. Because the collection step 101 is executed in the waste-solution line 55 through which the waste solution containing the catalyst 51 flows, the catalyst 51 is recovered from the waste solution containing the catalyst ink used for production of the MBA. Also, the method according to the first embodiment of the invention includes the centrifugation step 102 in which the catalyst 51 is extracted, through centrifugation, from the substance (including the catalyst 51 and the waste solution adhering to the catalyst 51) collected in the collection step 101. Accordingly, the waste solution in the collected substance is separated from the catalyst 51, and the catalyst 51 containing the magnetic material 53 is selectively extracted.

The effects of the system according to the first embodiment of the invention are as follows. The collection device (for example, the magnet) 54 is provided at onto the waste-solution line 55 through which the waste solution containing the catalyst 51 flows. Also, the centrifugal separation device 57 is further provided. The centrifugal separation device 57 extracts the catalyst 51, through centrifugation, from the substance collected by the collection device 54. Accordingly, the waste solution in the collected substance is separated from the catalyst 51, whereby only the catalyst 51 is extracted.

Hereafter, the second embodiment of the invention will be described with reference to FIGS. 2 and 3. First, the method according to the second embodiment of the invention will be described. According to the method, the catalyst 51, which is included in an already-assembled fuel cell (e.g. a fuel cell which turns out to be defective after the electrodes are formed, a fuel cell of which the evaluation has been finished and which is no longer necessary, and a fuel cell which has reached its end of life), is recovered. In a step 200 in FIG. 2, the already-assembled fuel cell is supplied as a material from which the catalyst will be recovered. The method according to the second embodiment of the invention includes a pulverization step 201, which is executed before the collection steps 101A and 101B. In the pulverization step 201, the MEA 19 including the catalyst layers is pulverized into small particles.

In the method for recovering a catalyst for a fuel cell according to the second embodiment of the invention, (A) the viscosity of the binder or the electrolyte contained in the small particles obtained by pulverizing the MEA 19 is decreased between when the pulverization step 201 is executed and when the collection step 101A is executed (for example, a dispersion step 202, in which the small particles obtained by pulverizing the MEA 19 are dispersed in a solvent 62, is executed as shown in FIG. 2, or a step, in which the small particles obtained by pulverizing the MEA are heated, is executed), or (B) the small particles obtained by pulverizing the MEA 19 in the pulverization step 201 are sent to the collection step 101B while being dry, and the catalyst 51 is collected in the collection step 101B.

In the case of the above-described method (A), the centrifugation step 102 and the recycle step 103 may be executed after the collection step 101 A as shown in FIG. 2, as in the case of the first embodiment. In the case of the above-described method (B), the recycle step 103 may be executed after the collection step 101B, as shown in FIG. 2.

The system according to the second embodiment of the invention, which executes the above-described method (A) or (B), includes a pulverization device 63 that pulverizes the MEA 19 including the catalyst layers into small particles before the magnetic material 53 is attracted by the collection device 54. The system according to the second embodiment of the invention, which executes the method (A), includes a dispersion device 64 that disperses the small particles, obtained by pulverizing the MEA 19 including the catalyst layers, in the solvent 62 between when the MEA 19 including the catalyst layers is pulverized by the pulverization device 63 and when the magnetic material 53 is attracted by the collection device 54.

The effects of the above-described methods (A) and (B) according to the second embodiment of the invention are as follows. Because the pulverization step 201, in which the catalyst layers are pulverized into small particles, is executed before the collection steps 101A and 101B, the diffusion layers 13, 16 and the electrolyte membrane 11 are also pulverized into small particles in the pulverization step 201. Accordingly, the catalyst 51 or the carrier 52 on which the catalyst 51 is supported, containing the magnetic material 53, is separated, through magnetic attraction, from the small particles of the diffusion layers 13, 16 and the electrolyte membrane 11, which do not contain the magnetic material, more reliably (than the case where the pulverization step 201 is not executed). Accordingly, the catalyst 51 or the carrier 52 on which the catalyst 51 is supported is recovered more reliably (than the case where the pulverization step 201 is not executed).

As in the method (A), when the dispersion step 202, in which the small particles obtained by pulverizing the catalyst layers are dispersed into the solvent 62, is executed between the pulverization step 201 and the collection step 101A, the small particles of the electrolyte membrane 11 contained in the pulverized elements are dissolved in the solvent 62. Accordingly, the catalyst 51 or the carrier 52 on which the catalyst 51 is supported, containing the magnetic material 53 that is not dissolved in the solvent 62, is separated, through magnetic attraction, from the electrolyte membrane 11, which does not contain the magnetic material, more reliably (than the case where the dispersion step 202 is not executed). Accordingly, the catalyst 51 or the carrier 52 on which the catalyst 51 is supported is recovered more reliably (than the case where the dispersion step 202 is not executed).

As in the method (B), when the small particles obtained by pulverizing the MEA 19 in the pulverization step 201 are sent to the collection step 101B while being dry, and the catalyst 51 is collected in the collection step 101 B, the solvent 62 and the catalyst 51 need not be separated from each other. As a result, the number of steps is reduced as compared with the case where the dispersion step 202 is executed.

The effects of the system, which executes the method (A) or (B) according to the second embodiment of the invention, are as follows. The system includes the pulverization device 63 that pulverizes the MEA 19 including the catalyst layers into small particles before the magnetic material 53 is attracted by the collection device 54. Accordingly, the diffusion layers 13, 16 and the electrolyte membrane 11 are pulverized into small particles by the pulverization device 63. Therefore, the catalyst 51 or the carrier 52 on which the catalyst 51 is supported, containing the magnetic material 53, is separated, through magnetic attraction, from the small particles of the diffusion layers 13, 16 and the electrolyte membrane 11, which do not contain the magnetic material, more reliably (than the case where the pulverization step 201 is not executed). Accordingly, the catalyst 51 or the carrier 52 on which the catalyst 51 is supported is recovered more reliably (than the case where the pulverization step 201 is not executed).

As in the system that executes the method (A), when there is provided the dispersion device 64 that disperses the small particles, obtained by pulverizing the catalyst layers, in the solvent 62 between when the catalyst layers are pulverized into small particles by the pulverization device 63 and when the magnetic material 53 is attracted by the collection device 54, the small particles of the electrolyte membrane 11 contained in the pulverized elements are dissolved in the solvent 62 in the dispersion device 64. Accordingly, the catalyst 51 or the carrier 52 on which the catalyst 51 is supported, containing the magnetic material 53 that do not dissolve in the solvent 62, is separated, through magnetic attraction, from the electrolyte membrane 11, which does not contain the magnetic material, more reliably (than the case where the dispersion step 64 is not executed). Accordingly, the catalyst 51 or the carrier 52 on which the catalyst 51 is supported is recovered more reliably (than the case where the dispersion step 202 is not executed).

The invention claimed is:

1. A method for recovering a catalyst for a fuel cell, comprising:
   a collection step in which a catalyst is collected by attracting, using a magnetic force, a magnetic material contained in at least one of the catalyst and a carrier on which the catalyst is supported.

2. The method according to claim 1, wherein the catalyst is made of an platinum cobalt alloy.

3. The method according to claim 1, further comprising:
   a recycle step which is executed after the collection step, and in which the collected catalyst is reused as a material for catalyst layers of a new fuel cell.

4. The method according to claim 1, wherein
   the collection step is executed in a waste-solution line through which a waste solution containing the catalyst flows.

5. The method according to claim 4, further comprising:
   a centrifugation step in which the catalyst is extracted, through centrifugation, from substance collected in the collection step.

6. The method according to claim 1, further comprising:
   a pulverization step which is executed before the collection step, and in which a MEA including the catalyst layers is pulverized.

7. The method according to claim 6, further comprising:
   a dispersion step which is executed between the pulverization step and the collection step, and in which the pulverized MEA is dispersed in a solvent.

8. The method according to claim 6, wherein
   the pulverized MEA is sent to the collection step while being dry so that the catalyst is recovered.

9. The method according to claim 1, wherein
   the carrier is recovered from catalyst layers of the fuel cell, and
   the catalyst is collected through magnetic attraction, after a viscosity of a binder that bonds adjacent carriers together is decreased.

10. A system for recovering a catalyst for a fuel cell, comprising:
    a collection device that attracts, using a magnetic force, a magnetic material contained in at least one of a catalyst and a carrier on which the catalyst is supported.

11. The system according to claim 10, wherein
    the collection device is provided at onto a waste-solution line through which a waste solution containing the catalyst flows, and
    the system further includes a centrifugal separation device that extracts the catalyst, through centrifugation, from substance collected by the collection device.

12. The system according to claim 10, further comprising:
    a pulverization device that pulverizes MEA including catalyst layers, before the magnetic material is attracted by the collection device.

13. The system according to claim 12, further comprising:
    a dispersion device that disperses the pulverized MEA in a solvent between when the MEA is pulverized by the pulverization device and when the magnetic material is attracted by the collection device.

14. The system according to claim 10, wherein
    the carrier is recovered from catalyst layers of the fuel cell, and
    the collection device collects the catalyst through magnetic attraction after a viscosity of a binder that bonds adjacent carriers together is decreased.

15. A method for recovering a catalyst for a fuel cell, comprising:
    Collecting a catalyst by attracting, using a magnetic force, a magnetic material contained in at least one of the catalyst and a carrier on which the catalyst is supported.

16. A method according to claim 15, wherein the catalyst is made of a platinum cobalt alloy.

17. The method according to claim 15, further comprising:
Reusing the collected catalyst as a material for catalyst layers of a new fuel cell, after collecting the catalyst.

18. The method according to claim 15, wherein the catalyst is collected in a waste-solution line through which a waste solution containing the catalyst flows.

19. The method according to claim 18, further comprising:
Extracting the catalyst, through centrifugation, from substance collected for collecting the catalyst.

20. The method according to claim 15, further comprising:
Pulverizing a MEA including the catalyst layers, before collecting the catalyst.

21. The method according to claim 20, further comprising:
Dispersing the pulverized MEA in a solvent, before collecting the catalyst, and after pulverizing a MEA including the catalyst layers.

22. The method according to claim 20, wherein, when the catalyst is collected, the pulverized MEA is in a dry condition.

* * * * *